United States Patent [19]

Valenzona et al.

[11] Patent Number: 4,747,133
[45] Date of Patent: May 24, 1988

[54] TELEPHONE LIGHT ADAPTER

[75] Inventors: Joseph F. Valenzona, 13739 Destino Pl., Cerritos, Calif. 90701; Richard W. Faith, Oxnard, Calif.

[73] Assignee: Joseph F. Valenzona, La Mirada, Calif.

[21] Appl. No.: 20,384

[22] Filed: Mar. 2, 1987

[51] Int. Cl.$^4$ .............................................. H04M 1/00
[52] U.S. Cl. ..................................... 379/376; 379/396
[58] Field of Search ............... 379/372, 373, 376, 377, 379/379, 396, 418, 441, 442, 443, 444; 362/88, 802

[56] References Cited

U.S. PATENT DOCUMENTS

| | | | |
|---|---|---|---|
| 1,985,172 | 12/1934 | Keller | 362/802 |
| 2,616,972 | 11/1952 | McNutt | 379/442 |
| 2,677,043 | 4/1954 | Hawk | 362/802 |
| 2,909,614 | 10/1959 | Goyette | 379/396 |
| 4,467,144 | 8/1984 | Wilkerson et al. | 379/373 |

FOREIGN PATENT DOCUMENTS

| | | | |
|---|---|---|---|
| 2846667 | 5/1980 | Fed. Rep. of Germany | 379/376 |
| 111953 | 1/1984 | Japan | 379/376 |
| 118987 | 1/1984 | Japan | 379/376 |

Primary Examiner—Robert Lev
Attorney, Agent, or Firm—Fulwider, Patton, Rieber, Lee & Utecht

[57] ABSTRACT

A telephone light adapter comprised of an electronic control box connected to a standard telephone and light fixture, the adapter energizing the light fixture when the control box is in an automatic mode for announcing an incoming telephone call, the light fixture remaining energized for a specified period of time after the termination of the call. The control box also energizes the light fixture when the telephone receiver is moved from the cradle position for dialing or when an extension telephone is in use. A three-position switch located on the control box permits the selection of mode of operation while a user switch permits manual operation.

24 Claims, 7 Drawing Sheets

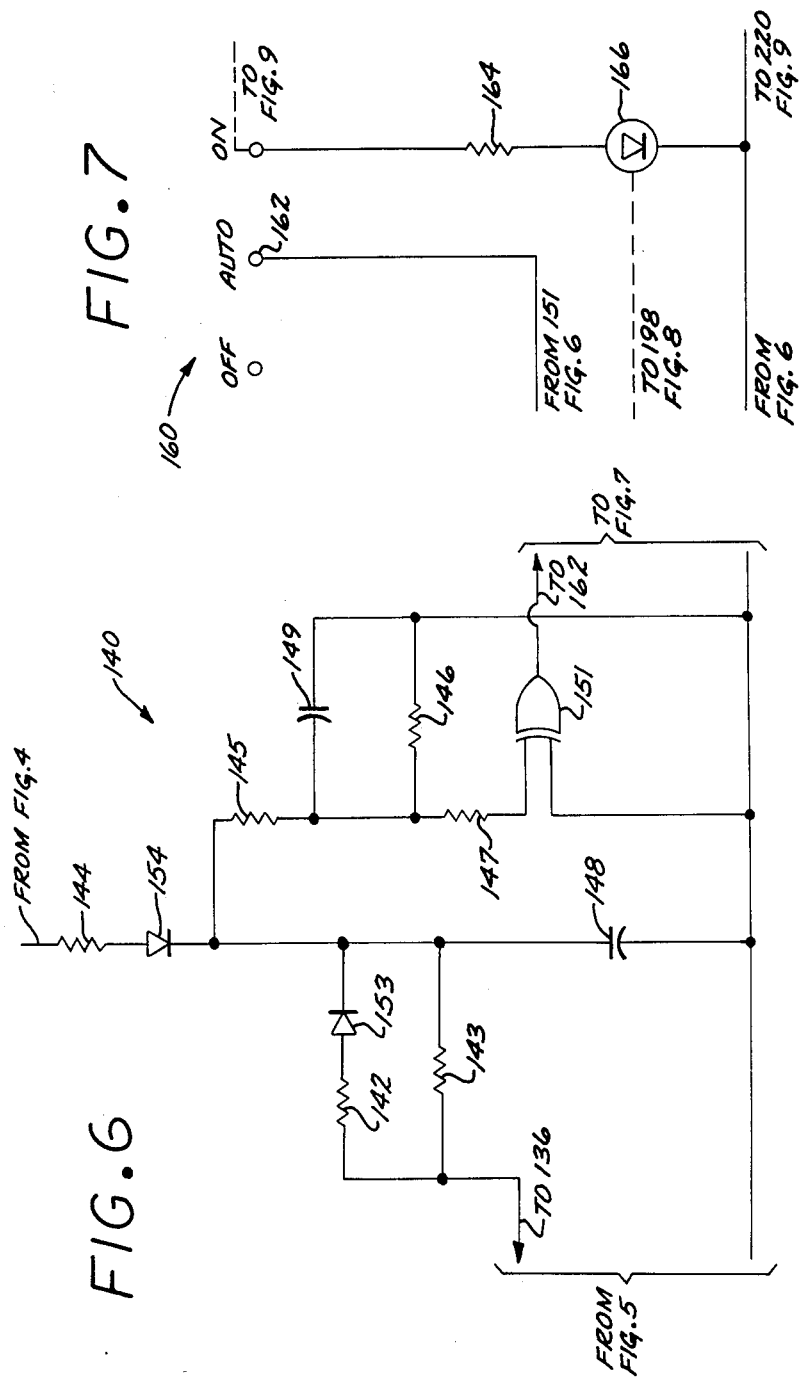

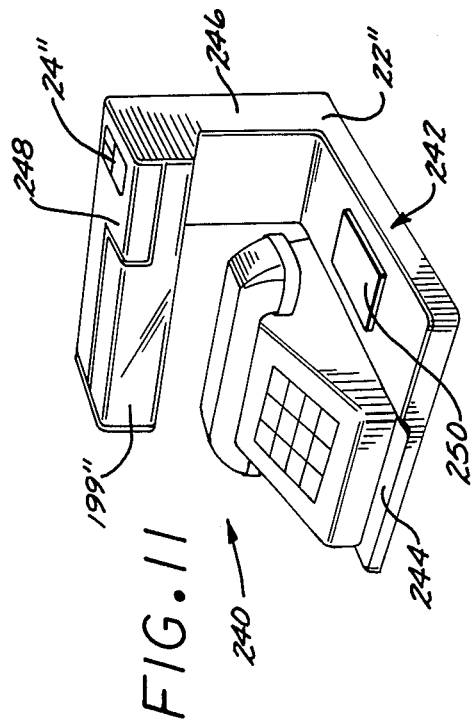
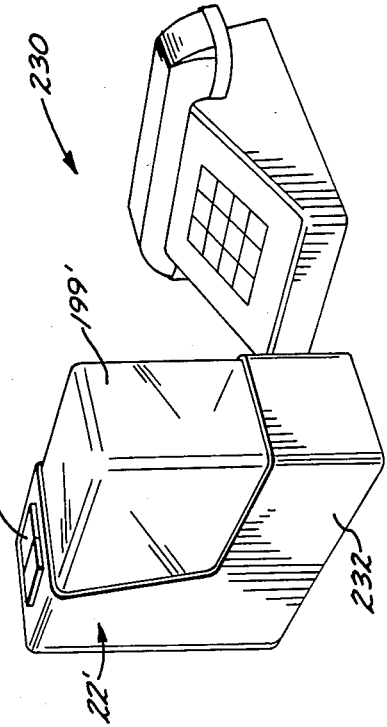
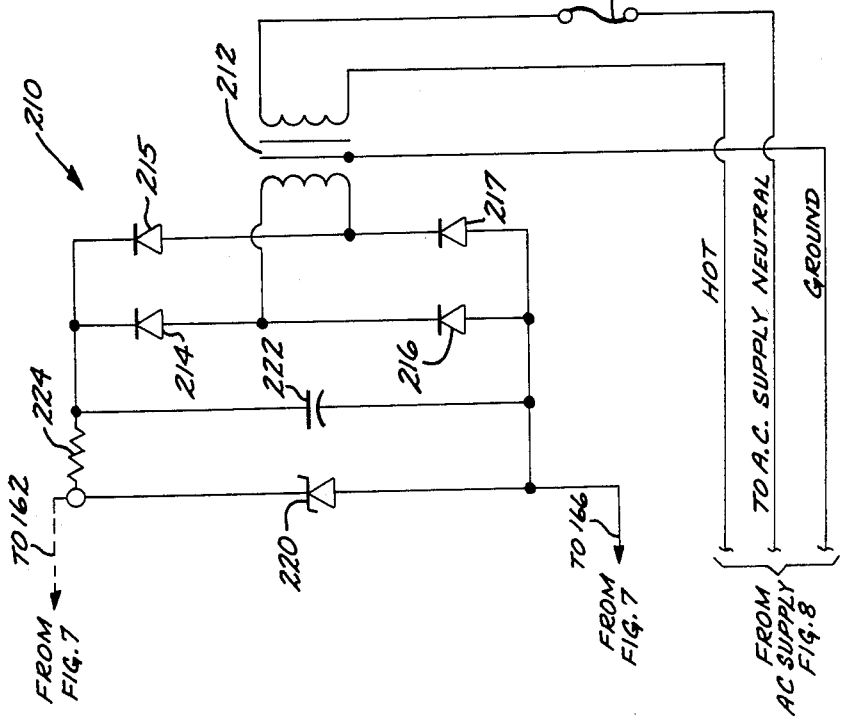

TELEPHONE LIGHT ADAPTER

BACKGROUND OF THE INVENTION

1. Field of the Invention

The invention relates generally to telephone accessories and more particularly to telephone circuitry designed to energize a light fixture whenever the telephone line to which the circuitry is connected is ringing or in use.

2. Description of the Prior Art

In the field of telephone communication, hand sets are designed to transmit and receive oral communications and generally do not incorporate any features designed to visually assist the recipient of a telephone call. A recipient of a telephone call where the telephone is located in a darkened room or during the night hours would be visually assisted if the telephone set incorporated a lamp device that generated sufficient light for announcing an incoming telephone call and for writing notes and reading instructions associated with many telephone calls. Such visual assistance would also improve the accuracy of dialing and eliminate eye strain experienced by those persons attempting to dial a telephone in a room having inadequate lighting or in a room where the room lighting switch is inconvenient to the telephone user.

Attempts in the past to solve some of these problems have resulted in the following U.S. patents. In U.S. Pat. No. 1,828,543 to C. C. Phillips (Oct. 20, 1931) entitled Telephone Light, there is disclosed a battery operated, clamp-on lighting device suitable for installation on the vertical stem of the housing of an upright telephone (housing design now obsolete). The clamp-on device also included a memo pad shelf for writing and the lamp could be activated by a manual switch or automatically by an operable switch having a contact end disposed over the receiver hook such that when the receiver is lifted from the hook the hook will engage the contact and through the metallic part of the telphone complete a circuit for the lamp.

In U.S. Pat. No. 1,945,956 to C. B. Rowell Feb. 6, 1934) entitled Telephone Stand and Light, there is disclosed a means for automatically closing a switch to illuminate the telephone dial when the receiver is removed for a supporting arm and to automatically open the switch when the receiver is replaced on the supporting arm. The automatic switch is in the form of a bell crank with two arms at right angles and pivoted at the housing. Also included is a spring employed to engage a finger on the automatic switch by means of a projection to throw or assist in throwing the automatic switch to an "on" or "off" position when the finger has passed over the center of the projection. A manual switch is also included.

Next, in U.S. Pat. No. 2,020,016 to M. J. Brusseau (Nov. 5, 1935) entitled Accessory Attachment For Telephone, there is disclosed a means for controlling the switching on and off of the illuminating means in response to lifting and replacement of the telephone instrument or receiver. A switch comprised of a pair of contacts is connected in series with a light bulb. A switch lever rockably supported on a pivot pin projects from the front of the housing. When an exposed end of the switch lever is down and the contact arm accordingly lifted from the contacts so that the switch is in the "off" position, an activating position of the switch is flat against a tray that holds the telehone. A spring urges the switch lever toward the "on" position. When the receiver is lifted from the cradle, the spring throws the switch to the "on" position and the light is illuminated. When the receiver is replaced into the cradle, the weight of the receiver overcomes the spring and the lamp is extinguished.

Finally, in U.S. Pat. No. 2,677,043 to H. W. Hank Apr. 27, 1954) entitled Lamp Attachment For Telephone Instruments, there is disclosed an illuminating means having a normal automatic switching arrangement as well as a manual override. A rockable lever arm is designed to include a conductive bar which is aligned with a set of electrical contacts. The lever arm is rotated about a pivot point on the telephone housing having a front leg located underneath the telephone receiver on the cradle. A spring which is held under compression so as to exert continuous yielding pressure against the lever tending to bias the forwardly projected front leg of the lever upwardly whenever the front leg is not restrained against upward movement by the receiver. Whenever the switching arrangement permits, the lamp will illuminate when the receiver is lifted from the cradle as the spring will bias the contact bar into engagement with the contacts so as to complete a circuit therethrough. The lamp will extinguish after the receiver is placed on the cradle.

Each of the above recited patents are directed to automatically illuminating a lamp after a transmitter-receiver is manually removed from the hook and to automatically extinguish the lamp once the transmitter-receiver was returned to the hook or cradle. Although these references do teach visual assistance for the recepient of a telephone call to permit writing, reading, accurate dialing and to reduce eye strain, the references do not teach a telephone set incorporating a telephone light which generates sufficient light for announcing an incoming telephone call which would be helpful to receipients of telephone calls in darkened rooms as well as to the hearing-impaired and those persons too far from the telephone to hear the ringer. This problem continues to exist without a solution to this long-felt need in the industry.

SUMMARY OF THE INVENTION

It is therefore an object of the present invention to provide an improved telephone light adapter having an electronic circuit incorporating a telephone light capable of automatic illumination when the telephone is ringing signaling an incoming call.

It is a further object to provide an improved telephone light adapter having an electronic circuit incorporating a telephone light capable of automatic illumination when the telephone is in use.

It is a further object to provide an improved telephone light adapter having an electronic circuit incorporating a telephone light where upon returning the receiver to the cradle the light remains illuminated for a specific time period.

Briefly, a preferred embodiment of the present invention includes a telephone light adapter comprised of an adapter control box. A standard telephone and light fixture are removably connected to the adapter control box which is then connected to a standard 120 volt AC, single-phase wall receptacle and a standard type RJ11C telephone receptacle. The adapter control box is electronically designed to operate with any standard telephone and light fixture. Located on the adapter control box is a three-position switch for controlling the operation of the light fixture, the positions being marked as "AUTO," "ON," and "OFF." The "AUTO" position is for automatic light fixture operation, the "ON" position is for continuous light fixture operation and the "OFF" position is for a continuously deenergized light fixture. The adapter control box comprises electronic circuitry including a ring detection circuit for identifying light fixture during the periodic silent pauses of the ringing signals and outgoing impulse-dialing pulses; an off-hook detection circuit for providing a positive output voltage for energizing the light fixture when the telephone line in in use; a timer circuit for sustaining the illumination of the ringing cycle and during a delay period after the telephone receiver is returned to the cradle, an opto-coupler circuit for maintaining the required electrical circuit characteristics where telephone lines and power lines interface; and thyristor AC switch circuit for permitting the miniscule current developed from the opto-coupler to energize the lighting fixture; and a DC power supply for energizing the adapter control box circuitry.

In the automatic mode, the control box automatically energizes the light fixture for announcing an incoming call and remains energized for the duration of the call plus a certain time delay period after termination of the call. This operation is beneficial to the hearing-impaired and to those persons answering the telephone in a darkened room permitting safe entry and exit. Further, the control box energizes the light fixture when the telephone receiver is moved from the cradle position which visually assists in dialing or when an extension telephone is in use which reduces the likelihood of interruption. A user switch is also located on the control box permitting manual operation.

In alternative embodiments, the control box and the light fixture are unitized into a single housing with several stylized versions and other convenience features for residential and business applications.

An advantage of the telephone light adapter of the present invention is that the electronic circuit incorporating a telephone light is capable of automatic illumination when the telephone is ringing signaling an incoming call.

Another advantage is that the telephone light adapter having the electronic circuit incorporating the telephone light is capable of automatic illumination when the telephone is in use.

A further advantage is that the telephone light adapter having the electronic circuit incorporates the telephone light which remains illuminated for a specified time period after returning the receiver to the cradle.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 6 is an electrical schematic diagram of a timer circuit of the telephone light adapter of FIG. 1;

FIG. 7 is an electrical schematic diagram of a switch and opto-coupler circuit of the telephone light adapter of FIG. 1;

FIG. 9 is an electrical schematic diagram of a direct current power supply of the telephone light adapter of FIG. 1;

FIG. 10 is a perspective view of a first alternative embodiment of a telephone light adapter of the present invention; and FIG. 11 is a perspective view of a second alternative embodiment of a telephone light adapter of the present invention.

DETAILED DESCRIPTION OF THE PREFERRED EMBODIMENT

Figure 1:
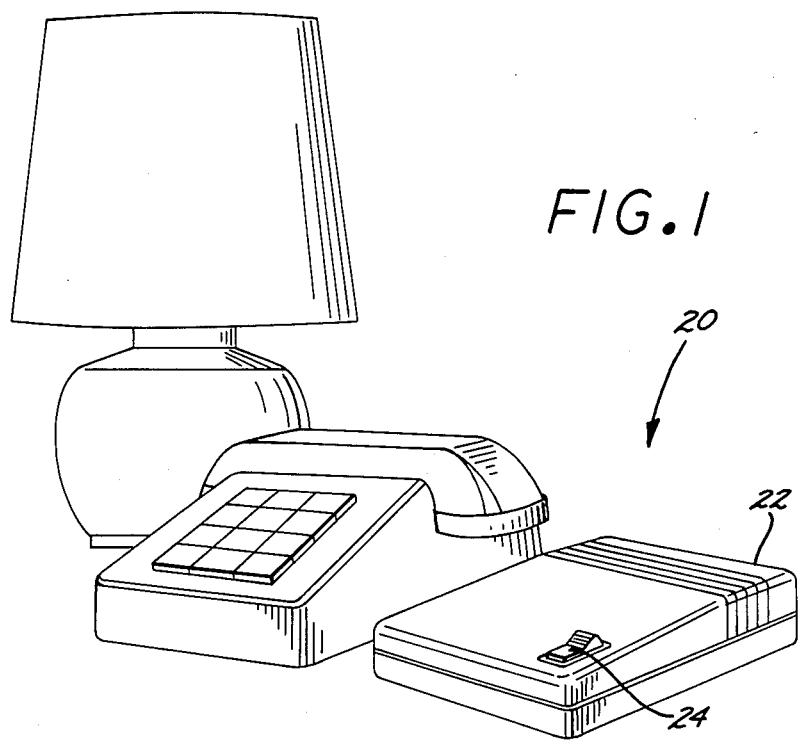
FIG. 1 is a perspective view of a telephone light adapter in accordance with the present invention.

A perspective view of a telephone light adapter is illustrated in FIG. 1 and is referred to by the general reference character 20 and incorporates the present invention. The telephone light adapter 20 comprises an electronic circuit which applies power to an incandescent lamp of 100 watts or less whenever a telephone line to which the electronic circuit is connected is ringing or in use. The light adapter 20 includes an adapter control box 22 with a three-position switch 24 located thereon so that the lamp may be removed from automatic control by telephone line activity and operated manually. The positions of switch 24 are marked "AUTO," "ON," and "OFF." The light adapter 20 is shown in proximity to a standard telephone and light fixture and is electronically designed to operate therewith. The position of the switch 24 controls the mode of the circuitry within the control box 22. The "AUTO" position is for automatic operation of the light fixture during incoming calls and when the receiver of the telephone is lifted from the cradle. The "ON" position of the switch 24 is for continuous operation of the light fixture while the "OFF" position is for a continuously deenergized light fixture.

Figure 2:
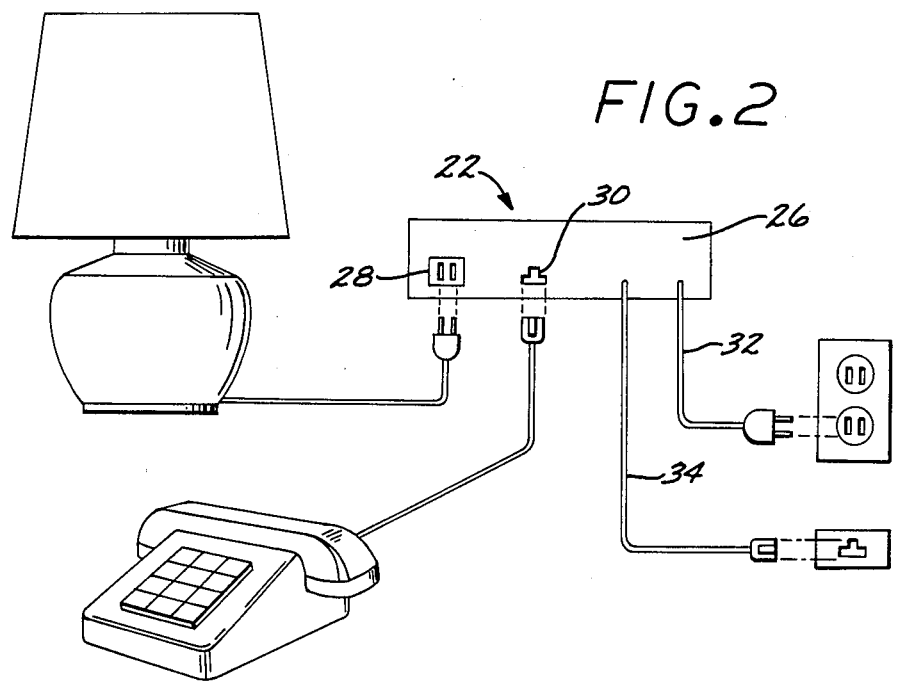
FIG. 2 is a connection diagram of the telephone light adapter of FIG. 1.

A connection block 26 located at the rear section of the control box 22 is shown in FIG. 2 and includes two receptacles 28,30 mounted therein and two cords 32,34 projecting therefrom. The first receptacle 28 is a standard 120 volt (AC) outlet for receiving a male connection plug from the light fixture. The second receptacle 30 is a telephone receptacle, such as a type RJ11C, for receiving a male connector plug from the telephone. The first cord 32 projecting from the connection block 26 is an electric cord equipped with a male connector for inserting into a standard 120 volt (AC), 60 Hz wall receptacle. Finally, the second cord 34 is a telephone line cord terminated by a male plug connector for inserting into a standard telephone outlet receptacle.

When the three-position switch 24 is in the automatic mode, the light fixture is automatically illuminated to indicate that the telephone to which the control box 22 is connected is ringing. This design is useful to the hearing-impaired and to those recipients of telephone calls who are beyond earshot of the ringer or who respond to a telephone call in a darkened room. After the telephone is answered, the lamp remains energized to provide adequate ligth for reading and writing thus eliminating the need to find the room light switch. Further, when the receiver is removed from the cradle to initiate a telephone call, the light fixture is immediately illuminated to visually assist in dialing the pushbuttons or rotary dialer. If an extension telephone is in use, the light fixture attached to the control box 22 is illuminated throughout the course of the call over the extension telephone reducing the probability that the call will be interrupted from the telephone connected to the control box 22. After the telephone call is terminated, the light fixture remains energized for a specified time period (see timer circuit in FIG. 6) to permit safe exit from a room during the darkened hours and to economically conserve electric power in unoccupied rooms. The three-position switch 24 offers the convenient feature of turning a light fixture on or off at the control box 22 without having to find a light switch inconveniently located under a lamp shade or on the wall. The light adapter 20 may be employed either in a residential or commerical environment. Examples of a residential application would be bedroom and hallway telephone locations, while examples of commercial applications would be hotel, motel, and inn rooms, acoustic testing rooms, and recording studios. In the latter two instances, the telephone call recipient needs to be advised of an incoming call which does not produce sound.

Figure 3:
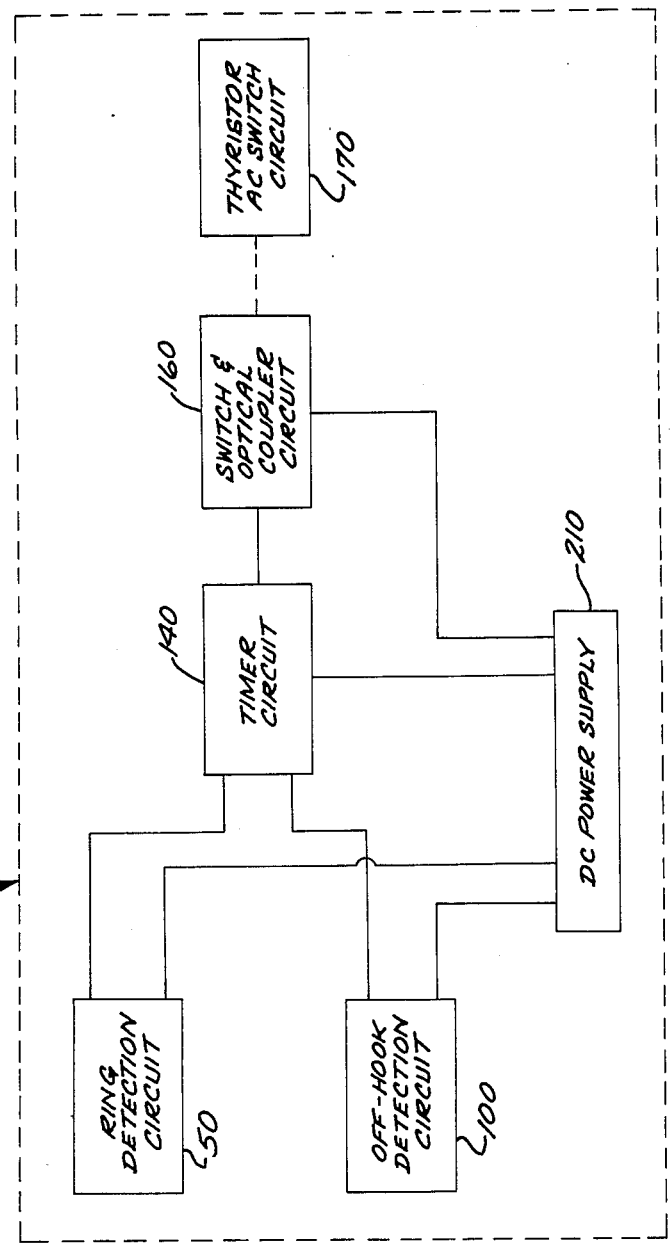
FIG. 3 is an electrical block diagram of the control box of the telephone light adapter of FIG. 1.

The electronic circuitry of the control box 22 is subdivided into six subcircuits as shown in FIG. 3. The six subcircuits include the following: a ring detection circuit 50 described in FIG. 4; an off-hook detection circuit 100 described in FIG. 5; a timer circuit 140 described in FIG. 6; a switch and opto-coupler circuit 160 described in FIG. 7; a thyristor AC switch circuit 170 described in FIG. 8; and a DC power supply 210 described in FIG. 9.

Figure 4:
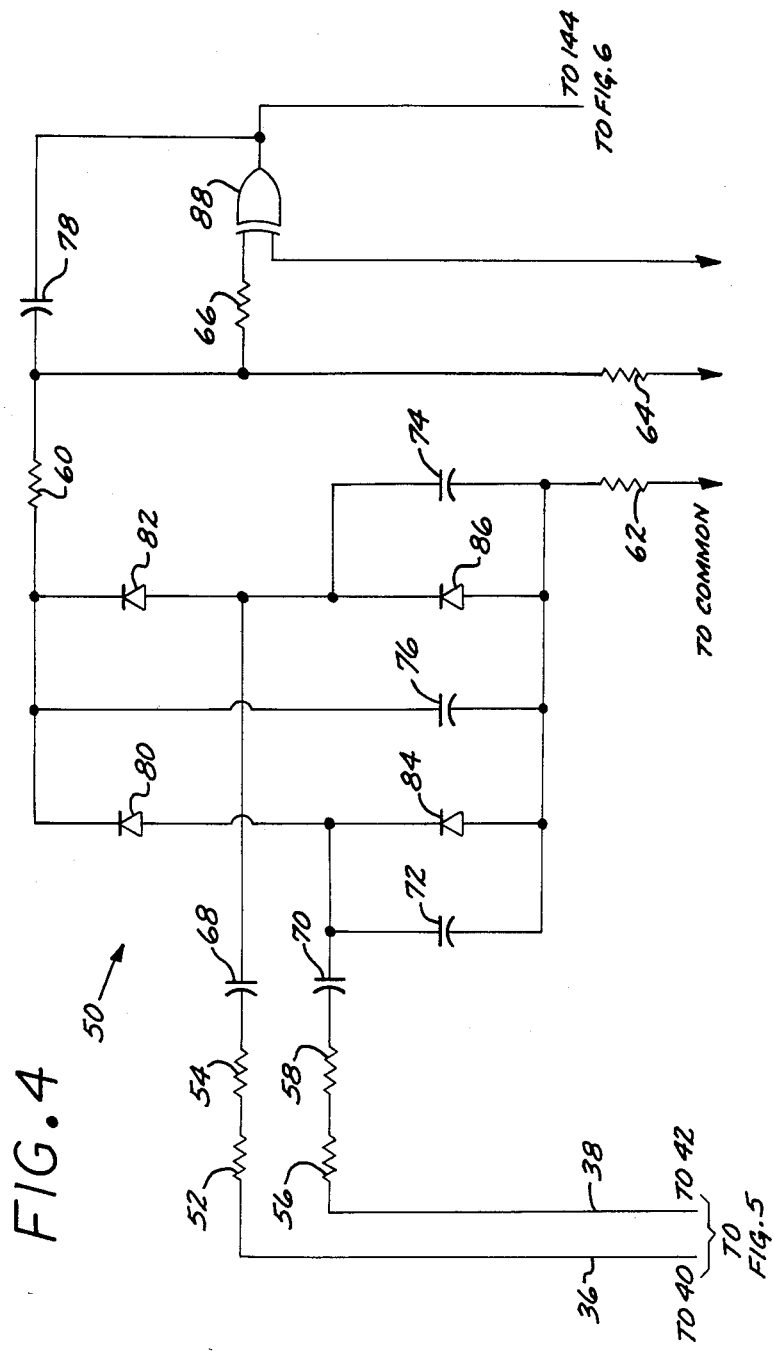
FIG. 4 is an electrical schematic diagram of a ring detection circuit of the telephone light adapter of FIG. 1.
Figure 5:
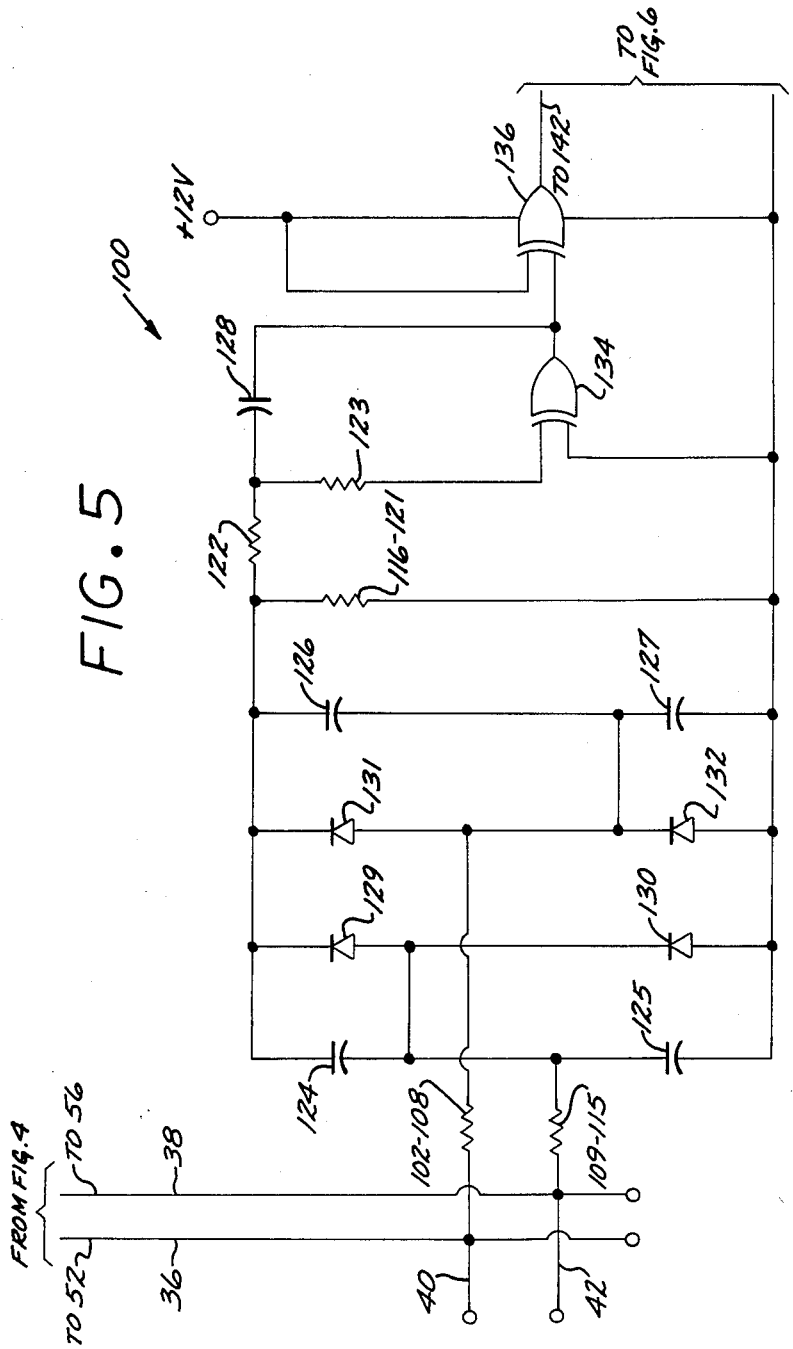
FIG. 5 is an electrical schematic diagram of an off-hook detection circuit of the telephone light adapter of FIG. 1.

A telephone line comprised of a twisted pair having a ring wire 36 and a tip wire 38 enters the control box 22 (see FIG. 4) and intercepts the telephone set lines comprised of a second pair 40,42 (see FIG. 5). The telephone line (36, 38) is further connected to the ring detection circuit 50. The above recited circuits are divided into two main sections. The first section is comprised of components connected only to the telephone line (36, 38) and includes the ring detection circuit 50, the off-hook detection circuit 100, the timer circuit 140, and the switch and opto-coupler 160, the combination being a logic section which determines whether or not the light fixture should be illuminated. The second section comprises the thyristor AC switch circuit 170, the function of which is to produce an electrical connection between the light fixture and the 120 volt AC line in response to a signal from the first logic section via optical means. The DC power supply 210 provides a source of DC power to the first section.

The ring detection circuit 50 illustrated in FIG. 4 consists of the following components: resistors 52, 54, 56, 58, 60, 62, 64, and 66; capacitors 68, 70, 72, 74, 76, and 78; diode rectifiers 80, 82, 84, and 86; and exclusive "or" logic gate 88. The function of the ring detection circuit 50 is to identify when a ringing signal exists on the incoming telephone line (36, 38) and any such AC signal on the telephone line (36,38) which exceeds about 25 volts RMS and has a frequency in the range of (4–72) Hz will cause the output signal of gate 88 to increase to the high state value. The only signals that normally appear on the telephone lines (36,38) with such voltages and range of frequencies are ringing signals and outgoing impulsedialing pulses. The operation of the light fixture is desirable in either situation.

Incorporated within the ring detection circuit 50 is an input network 90 comprised of resistors 52, 54, 56, 58, 60, 62, 64, and 66, the capacitors 68, 70, 72, 74, and 76 and the diode rectifiers 80, 82, 84, and 86. The input circuit 90 receives the ringing signal from the telephone line (36,38) and conditions the telephone line voltages such that any incoming ringing signal will produce a positive rectified voltage at the upgrounded input to gate 88. Gate 88 is an exclusive "or" circuit and is connected as a non-inverting buffer and acts to inteface the output of the ring detection circuit with other circuits of the control box 22. The exclusive "or" device has two signal inputs and an output. When one of the signal inputs is tied to the low voltage (ground) side of the circuit and the second input receives a signal (as with gate 88), a high output state amplified signal will appear at the output whenever the second input signal is greater than or equal to half supply voltage. Gate 88, having its first input tied to the ground side of the circuit behaves as a typical non-inverting CMOS buffer according to the following rules. A first rule is that the output voltage tends to be nearly equal to the lowest supply voltage for all input signal voltages whose magnitudes are less than half the supply voltage. A second rule is that the output voltage tends to be nearly equal to the supply voltage for all input signal voltages whose magnitudes are greater than half the supply voltage. There exists a plurality of input signal voltages having magnitudes which fall into the region of half the supply voltage. In this middle region, the transfer characteristic of gate 88 appears to be a step function as the signal input passes through approximately half of the typical (12 volt) supply voltage. Although the slope (amplifier gain) of the aforementioned step portion of the transfer characteristic is actually less than infinite, the slope is sufficiently large to be treated as infinite in relation to the operation of gate 88. As a result, gate 88 performs as an infinite gain saturating amplifier switching output states as the voltage of the second input signal traverses a "threshold value" which is approximately half the supply voltage. Resistors 52, 54, 56, 58, 60, 62, and 64 establish appropriate sensitivity. The series connection of resistors 52 and 54 and the separate series connection of resistors 56 and 58 are designed to accommodate the high voltage transients that are known to occur on the telephone lines (36,38) while preventing damage to the respective resistors 52, 54, 56, and 58. Details on high-voltage transients likely to occur on telephone lines can be found in the FCC Rules & Regulations, Part 68. The function of resistor 62 is to minimize the susceptibility of the ring detector circuit 50 to false triggering by high AC common-mode voltages which are referred to as "longitudinal" voltages in the AT & T Specifications and the Bell Technical Reference. The "longitudinal" voltages are measured from tip wire 38 or ring wire 36 to earth ground potential and are often caused by inductive coupling between the telephone lines (36,38) and overhead power lines.

Capacitors 68,70 block DC signals so that only AC signals are detected while capacitors 72, 74, and 76 shunt possible RF interference currents around the bridge rectifier comprised of diode rectifiers 80, 82, 84, and 86. The aforementioned full wave bridge rectifier converts the AC ringing signal to a DC signal. Note that the negative side of the bridge rectifier (diodes 80, 82, 84, and 86) is indirectly grounded through resistor 60 and that resistors 60, 62, and 64 are all equal in ohmic value. One of the many advantages of this design is the minimal sensitivity to common-mode (longitudinal) voltages while retaining high sensitivity to differential-mode (metallic) voltages. Thus, the ring detection circuit 50 is optimized for reliably responding to valid ring signals while avoiding nuisance responses to non-ringing voltages. With reference to gate 88, as the input signal voltage in the region of half supply voltage increases, the output voltage changes rapidly. The feedback path around gate 88 through capacitor 78 provides a hysteresis effect which tends to retain the output of gate 88 in the state it was previously in and not to vary between the high logic and low logic states even though new forces are applied. The intent is to achieve a votlage sensitive switch where input voltages greater than or equal to half supply voltage result in a high output state and where input voltages less than half the supply voltage result in a low output state of gate 88. Also this design affords some immunity to high freuqency noise such that the output signal is somewhat insensitive to noise on the input signal and thus false ring detection due to noise is avoided. Resistor 66 limits the input current flowing into gate 88 during output transistions.

The off-hook detection circuit 100 is illustrated in FIG. 5 and consists of resistors 102, 103, 104, 105, 106, 107, 108, 109, 110, 111, 112, 113, 114, 115, 116, 117, 118, 119, 120, 121, 122, and 123, capacitors 124, 125, 126, 127, and 128, diode rectifiers 129, 130, 131, and 132 and exclusive "or" gates 134, and 136. The function of the off-hook detection circuit 100 is to provide a positive output voltage to energize the aforementioned light fixture whenever the telephone line (36, 38) to which the control box 22 is connected is in use. An energized light fixture under these conditions signifies that the telephone line (36, 38) is connected to a telephone in which the receiver has been removed from the cradle (off-hook condition). The means of detecting the off-hook condition is essentially a saturating DC amplifier comprised of exclusive "or" gate 134 which provides a low logic state output whenever the DC voltage drop across the telephone line (36, 38) falls below approximately 21 volts. The design and operation of gate 134 is duplicate to gate 88 (a non-inverting buffer) in that one input lead receives a signal voltage while the second input lead is connected to the low ground side. The same transfer characteristic is applicable in that gate 134 is a buffered CMOS device.

Resistors 102-108 are connected in series as is shown in FIG. 5 to permit the desired 154-megohm resistance to be achieved by series connecting seven 22-megohm resistors. Similarly, resistors 109-115 are connected in series to achieve a desired total resistance of 154-megohms, and resistors 116-121 are connected in series to provide 132-megohms. For such extremely large ohmic values, this represents the economic approach since the 22 megohm resistor is the highest ohmic value commonly available in low-cost, prefabricated resistors. Resistors 102-121 provide attenuation to the incoming DC voltage so that when the DC signal input voltage (less the applicable forward voltage drops on diode rectifiers 129 and 132 or on diode rectifiers 130 and 131) falls below about 20 volts, the voltage at the input to gate 134 will fall below the nominal 6 volt threshold. Specifically, the function of resistors (116-121) is to provide such loading upon the diode bridge comprised of diode rectifiers (129-132) and utilimately the input resistances (102-108) and (109-115) as to develop an output voltage of about 6 volts when the tip (38)-to-ring (36) voltage is approximately plus or minus 21 volts. The associated gate 134 (a CMOS device) has a threshold voltage which is nominally half of the CMOS supply voltage. Since the CMOS supply voltage herein is a +12 volt supply, the input threshold to gate 134 is about 6 volts so that the threshold of the off-hook detection circuit 100 is established at roughly plus or minus 21 volts DC. The diode rectifiers (129-132) are included as a diode bridge so that the off-hook detection circuit 100 is insensitive to the polarity of the telephone line (36, 38) while capacitors (124-127) desensitize the off-hook detection circuit 100 to AC interference, particularly the RF variety. The non-inverted signal at the output of gate 134 is AC-coupled back to the input of gate 134 via capacitor 128 providing AC hysteresis. The AC hysteresis helps provide immunity to false response of gate 134 to RF signals and noise. Had a single inverting buffer been employed instead of the two-stage buffer (non-inverting gate 134 and inverting gate 136), the desirable hysteresis effect would have been sacrificed. Resistor 123 limits the input current into gate 134 during transitions in the output voltage of gate 134. Exclusive "or" gate 136 receives the output voltage of gate 134 and is connected as an inverting buffer since the input signal from gate 134 is received on the first input lead to gate 136 while the second input lead is connected to the positive 12 volt DC supply and not the low ground side as with gates 88 and 134. Therefore, while the telephone line is in use (off-hook condition), the signal output from gate 136 will be the high state condition signifying such condition.

The timer circuit 140 illustrated in FIG. 6 consists of resistors 142, 143, 144, 145, 146, and 147, capacitors 148 and 149 and exclusive "or" gate 151. Further, diode rectifiers 153 and 154 form an "or gate" such that an input signal to the timer circuit 140 from either the ring detection circuit 50 (e.g., gate 88) or the off-hook detection circuit 100 (e.g., gates 134,136) will quickly produce a high output state from the gate 151. The "or" gate diodes 153 and 154 are separate from the timer circuit 140. The timer circuit 140 performs two significant functions within the control box 22. When the telephone receiver is in the "off-hook" (in use) condition, such condition is easy to detect, since the receiver is lifted from the cradle. Detecting the "on-hook" condition is, likewise, easy to detect as the receiver is continuously in the cradle of the telephone. Under either of these conditions, the circuitry of the control box 22 would energize the light fixture. The most difficult case is the ringing situation in which the telephone ringer operates, for example, approximately 2 seconds and then pauses for the next 4 seconds. One of the many novel features of the instant invention is that the light fixture is illuminated continuously upon the receipt of a telephone call. This objective is accomplished by the timer circuit 140 which sustains the "on-period" of the light fixture during the periodic silent pauses of the ringing cycle. The timer circuit 140 also provides a delay period in which the light fixture remains illuminated after the telephone receiver is returned to the cradle and the call is terminated.

Capacitor 148 is a timing capacitor which accumulates a voltage thereacross which is monitored by resistors 145, 146, and 147 and gate 151. Specifically, the function of resistors 145 and 146 is to introduce a controlled amount of DC voltage feedback around gate 151 for providing hysteresis so that the output voltage transitions of gate 151 occur rapidly and without oscillations. The timing capacitor 148 is nearly charged to the 12 volt DC potential early during the ringing cycle and at the beginning of the delay period. Resistors 142 and 144 are small in value and allow the current to flow through diode rectifiers 153 and 154 respectively to charge the timing capacitor 148. Resistor 143 is a large discharge resistor for permitting the discharge of timing capacitor 148 very slowly so that the output of the timing circuit 140 will return to a low state approximately seven seconds after all activity on the telephone line (36, 38) ceases. The latter inactive condition on the telephone line (36, 38) is characterized by a DC voltage considerably greater than plus or minus 21 volts and by the absence of any large, low frequency AC signals. Timing capacitor 148 charges and discharges according to the time constant built into the circuit and reaches a peak charge of approximately 11 voltage DC. During the high output state of gate 151, the high gain transition region of the CMOS transfer characteristic is exploited as in the previously described gates. In order to exploit the middle range of the transfer characteristic, timing capacitor 148 must be discharged to below the 6 volts threshold level of gate 151. Once timing capacitor 148 is discharged below 6 volts DC, the resistors 145 and 146 are employed to raise the threshold voltage of gate 151 to above 6 volts DC, so that once the output of gate 151 has fallen to the low state, gate 151 tends to be maintained in the low state.

The switch and opto-coupler circuit 160 is shown in FIG. 7 and includes a three-position switch 162, a resistor 164, and an infrared light emitting diode 166, which is part of an opto-coupler whose output device is phototransistor 198. The purpose of the switch and opto-coupler circuit 160 is two-fold. First, the switch 162 is provided to permit the mode of light fixture operation to be conveniently changed, and second the opto-coupler infrared light emitting diode 166 (hereinafter LED 166) is provided to comply with FCC regulations. Those regulations generally recite that in circuitry which interfaces with telephone lines (36, 38), particularly AC power utility circuitry, direct connections between the telephone and power systems are not permitted. Thus, the electrical activity in one circuit must be transferred to the other circuit by other than electrical connection means. Therefore, the FCC requirements bearing upon impedances and dielectric characteristics of circuitry wherein telephone lines and power lines interface are fully complied with.

Electronic information in the telephone line (36, 38) terminating in the timer circuit 140 can control activity in the adjacent thyristor AC switch circuit 170 (see FIG. 8) while being electrically isolated therefrom. The dielectric barrier between the infrared LED 166 of the switch and opto-coupler circuit 160 and the phototransistor 198 of the thyristor AC switch circuit 170 (see FIG. 8) provides the required electrical isolation between the telephone line and the power line. It is understood that the aforementioned light fixture is to be illuminated when the phototransistor 198 is conducting. The nature of the switch and opto-coupler circuit 160 is that the phototransistor 198 conducts when and only when the LED 166 is energized and that occurs only when the conditions of the logic section of control box 22 so dictate that the light fixture be energized. Under these conditions, the LED 166 is energized to emit invisible infrared energy to the phototransistor 198. A small electrical current (micro amperes) flows in the phototransistor 198 which permits the thyristor AC switch circuit 170 to conduct and energize the light fixture. It follows then, that when switch 162 is in the "off" position (open circuit position), the light fixture remains deenergized. When switch 162 is in the "auto" position, the light fixture will automatically be illuminated when the activity on the telephone line (36, 38) is initiated and will be extinguished approximately seven seconds after telephone line activity ceases. Finally, when switch 162 is in the "on" position, the light fixture will be continuously illuminated notwithstanding the conditions on the telephone line (36, 38). Resistor 164 functions to limit the current in LED 166 to a safe value.

Figure 8:
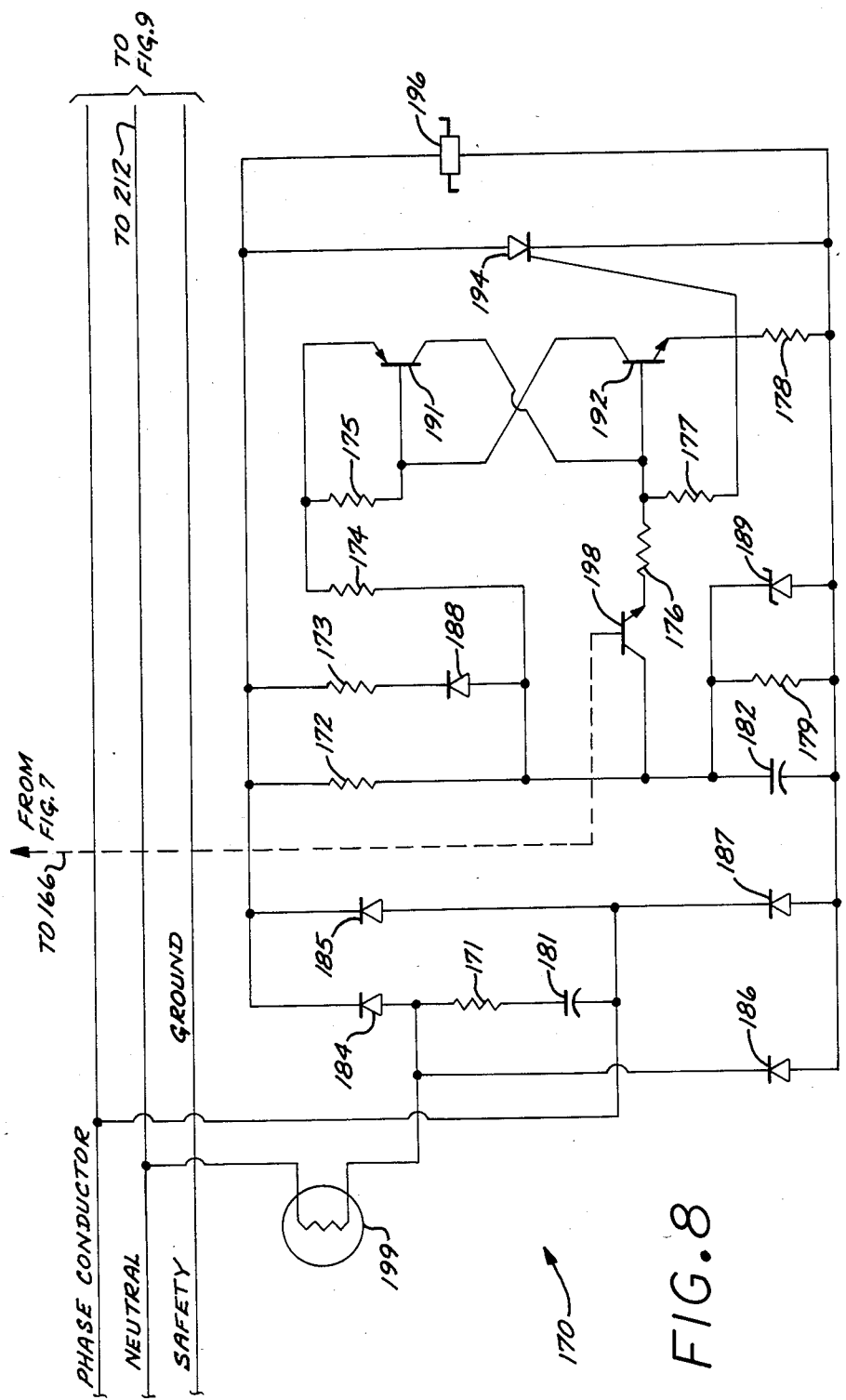
FIG. 8 is an electrical schematic diagram of a thyristor AC switch circuit of the telephone light adapter of FIG. 1.

The thyrisor AC switch circuit 170 which is illustrated in FIG. 8 includes resistors 171, 172, 173, 174, 175, 176, 177, 178 and 179, capacitors 181, 182, diode rectifiers 184, 185, 186, 187 and 188, zener diode 189, cross-coupled transistors 191 and 192, a silicon controlled rectifier 194, a varistor 196, and the opto-coupler phototransistor 198. The object of the thyristor AC switch circuit 170 is to permit the miniscule current (microamps) flowing in the phototransistor 198 to energize the light fixture 199. A full-wave bridge rectifier comprised of diode rectifiers (184–187) has a pair of AC input terminals series connected to light fixture 199 and to a source of AC voltage. The DC output terminals of the full-wave bridge rectifier (across diode rectifiers 185, 187) are parallel connected across the terminals of the silicon controlled rectifier 194 (hereinafter SCR 194) such that whenever SCR 194 conducts, a short circuit exists across the output of the bridge rectifier (diodes 184–187) causing the light fixture 199 to illuminate.

The operation of the thyristor AC switch circuit 170 is best understood if the phototransistor 198 is assumed to be in a conducting state and that the AC power source is just beginning a positive or negative half-cycle. The bridge rectifier circuit (diode rectifiers (184–187) causes the half-cycle polarity to be unimportant as the electric power always flows through SCR 194 in the same direction regardless of which pair of diodes conducts. For example, on a first half cycle, the current flows from the neutral conductor, through the lamp fixture 199, through diode 186, SCR 194, diode 185 and back to the phase conductor. On a second half cycle, the current flows from the phase conductor, through diode 187, SCR 194, diode 184 and back to the neutral conductor via lamp fixture 199. The SCR 194 is a uni-directional device which requires full wave rectification in order to become a properly polarized switch for both positive and negative half-cycles. As the instantaneous voltage at the cathodes of diodes 184, 185 rises with respect to the anodes of diode 186, 187, the capacitor 182 is charged at an increasing rate through resistor 172. The resistor 172 and capacitor 182 comprise a charging circuit that is designed to initiate conduction in SCR 194. Resistor 172 establishes a limit on the current that flows into capacitor 182 so that during the increasing portions of the positive and negative half-cycles, resistor 172 supplies charging current to capacitor 182 which is a reservoir of energy to initiate conduction of SCR 194. At the zero crossing points, SCR 194 ceases conducting. The SCR 194 does not conduct immediately upon capacitor 182 being charged but instead is maintained in a non-conducting state until capacitor 182 has charged sufficiently to guarantee reliable triggering of SCR 194. With phototransistor 198 conducting, nearly all of the voltage across capacitor 182 is impressed across a voltage divider comprised of resistors 176 and 177 such that by the time capacitor 182 has charged to approximately 8 volts DC, transistor 192 beings to conduct.

The voltage divider comprised of resistors 176 and 177 functions to bias the base-emitter junction of transistor 192. The circuit is designed such that a voltage of approximately 8 volts DC must appear across capacitor 182 in order to produce a bias of six-tenths of a volt across the base-emitter junction of transistor 192. The collector of transistor 192 is connected to the base of transistor 191, so that conduction in transistor 192 tends to cause conduction in transistor 191. Similarly, the collector of transistor 191 in turn is connected to the base of transistor 192, so that any conduction in transistor 191 originally initiated by conduction in transistor 192, is caused to vigorously enhance the conduction in transistor 192. The resulting avalanche of conduction within transistors 191 and 192 causes a large portion of the energy stored in capacitor 182 to be abruptly released at a high current into the gate electrode of SCR 194. This action results in the initiation of conduction of SCR 194. The half-cycle is still very young at this point, such that the preceding period of non-conduction in light fixture 199 does not represent a significant loss of power to the light fixture 199. The sudden and rapid discharge of current from capacitor 182 causes SCR 194 to conduct energizing the light fixture 199 and to remain conducting throughout virtually the entire remainder of the half-cycle. As the AC power source completes the half-cycle, the instantaneous current in SCR 194 becomes too small to sustain conduction causing SCR 194 to stop conducting. If the phototransistor 198 continues to receive a signal from the LED 166, the entire sequence will be repeated. If the LED 166 does not send a signal, the phototransistor 198 has a high impedance and the light fixture 199 will be extinguished, since a path to SCR 194 through resistor 176 no longer exists.

Resistor 174 limits the peak discharge current from capacitor 182 to a value that is harmless to the transistors 191 and 192, and the gate of SCR 194. Resistor 175 prevents the initiation of significant conductions of transistor 191 until the conduction current of transistor 192 has attained a desired value. This design helps to establish a highly predictable triggering voltage at the base of transistor 192 while resistor 175 also helps to prevent unwanted spontaneous conduction of transistors 191, 192 at elevated temperatures. The resistors 173, 179 and diode rectifier 188 are employed to deactivate the thyristor AC switch circuit 170 by completing the discharge path of capacitor 182 after SCR 194 begins to conduct. Resistor 173 is small and the diode rectifier 188 is poled to permit discharge of capacitor 182 only on the decaying portion of each half-cycle. However if capacitor 182 should remain significantly charged, then transistors 191, 192 may fail to stop conducting making the generation of successive trigger pulses impossible and ultimately rendering the light fixture 199 inoperative. The capacitor 182 must be discharged at the end of each cycle to terminate conduction in transistors 191, 192. This conditions capacitor 182 to again recharge for the next cycle to trigger the SCR 194 into conduction. Resistor 178 provides a path for the emitter of transistor 192 to the circuit ground potential of the thyristor AC switch circuit 170 until the conduction avalanche of transistors 191, 192 occurs. Further, resistor 178 helps prevent the SCR 194 from spontaneously conducting due to heat, static, or radiation by providing a low impedance return path from the gate of SCR 194 to the cathode of SCR 194 below the trigger point. The zener diode 189 protects transistors 191, 192 against overvoltage when phototransistor 198 is in a non-conducting state and a high voltage charge tends to build up on capacitor 182. The combination of resistor 171 and capacitor 181 forms a "snubber" network which suppresses recurring transient voltages on the AC supply voltage from periodically energizing SCR 194. Finally, the varistor 196 protects SCR 194 and diode rectifiers (184–187) against damage due to high voltage AC transients. Thus, varistor 196 begins to conduct if the voltage across the line exceeds (300–400) volts peak, acting as a shunt device.

The DC power supply 210 for the sensing circuit is illustrated in FIG. 9. The combination of the ring detection circuit 50, the off-hook detection circuit 100, and the timer circuit 140 are collectively referred to as the sensing circuit which is driven by a simple power supply consisting of a transformer 212, diode rectifiers 214, 215, 216, and 217, a zener diode 220, a capacitor 222, a resistor 224, and a fuse link 226. The transformer 212 steps the incoming 120 volt AC line voltage down to approximately 19 volts RMS. Conversion of the AC voltage at the secondary winding of transformer 212 to DC voltage is accomplished by a bridge rectifier circuit comprising the diode rectifiers 214–217. The capacitor 222 is employed as a filter to reduce the ripple content of the resultant DC voltage to a tolerable level. The resistor 224 and the zener diode 220 form a shunt regulator for stabilizing the DC voltage output from the bridge rectifier. The zener diode 220 operates as a regulator in the zener region of the diode characteristic curve. The secondary current of transformer 212 is limited to a safe value by resistor 224 with the regulating zener diode 220 shunting the excess current. Thus, the output of the power supply 210 is maintained at a stable level of approximately 12 volts DC.

The first alternative embodiment of the telephone light adapter is illustrated in FIG. 10 and is referred to by the general reference numeral 230 and incorporates the present invention. Those components employed in adapter 230 that are common to the components employed in the telephone light adapter 20 of the preferred embodiment are identified by a single prime designation. The adapter 230 includes an adapter control box 22' having a three-position switch 24' mounted thereon so that the mode of the light fixture control may be altered. The control box 22' is shown in proximity to a standard telephone, however, the light fixture 199' (shown as element 199 in FIG. 8) is integrated into a housing 232 of the control box 22' to provide a unitized modern appearance. The housing 232 incorporating the control box 22' is rectangular in shape with the light fixture 199' mounted in an interior corner thereof. A control block 26' (not shown) includes a telephone receptacle for the telephone but the light fixture 199' is wired internally. The operation of the circuitry is identical to that described in FIGS. 3–9 inclusive.

The second alternative embodiment of the telephone light adapter is illustrated in FIG. 11 and is referred to by the general reference numeral 240 and incorporates the present invention. Those components common to the components employed in the telephone light adapter 20 are identified by a double prime designation. The adapter 240 includes an adapter control box 22" having a three-position switch 24" mounted thereon so that the lamp control mode may be altered. The control box 22" is mounted within a housing 242 which includes a shelf 244 for supporting a telephone thereon, a vertical support 246, and an overhanging canopy 248 which incorporates the light fixture 199" thereon. Another feature available includes a built-in pen and pad holder 250 while additional features available (but not shown) include extra telephone receptacles for answering machines and personalized face plates for business and hotel establishments to which embodiment 240 is additionally suited.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alternatives and modifications as fall within the true spirit and scope of the invention.

We claim:

1. A telephone light adapter for announcing an incoming telephone call and for visual assistance comprising, in combination:
    housing means for enclosing said telephone light adapter;
    control means mounted within said housing means for receiving an input signal from a telephone line and further including a circuit for controlling the connection of an alternating current power source to a light fixture;
    direct current supply means in electrical communication with said circuit for supplying direct current voltage to said control means;
    logic means located within said circuit for recognizing an incoming telephone call and for signaling for the connection of the alternating current power source to said light fixture;
    connection means located within said circuit for receiving a signal from sid logic means and for connecting said light fixture to said alternating current power source upon the receipt of a telephone call; and
    switch circuit means located within said connection means, said switch circuit means having an optical transducer in communication with said logic means, said switch circuit means for providing amplification of a parameter flowing in said transducer wherein said amplified parameter triggers a component for providing a completed circuit for said light fixture.

2. The telephone light adapter of claim 1 wherein said control means further includes a connection block for removably connecting said light fixture and said telephone to said control means.

3. The telephone light adapter of claim 1 wherein said light fixture is integrally mounted within said control means.

4. The telephone light adapter of claim 1 wherein said control means further includes a threeposition switch for changing the mode of operation of the telephone light adapter.

5. The telephone light adapter of claim 4 wherein said three-position switch includes an "automatic" position wherein said light fixture is connected to said alternating current power source upon the receipt of an incoming telephone call.

6. The telephone light adapter of claim 4 wherein said three-position switch includes an "on" position wherein said light fixture is continuously connected to said alternating current power source.

7. The telephone light adapter of claim 4 wherein said three-position switch includes an "off" position wherein said light fixture is continuously disconnected from said alternating current power source.

8. The telephone light adapter of claim 1 wherein said logic means comprises a ring detection circuit for identifying when a ringing signal exists on an input terminal of said telephone line.

9. A telephone light adapter for announcing an incoming telephone call and for visual assistance comprising, in combination:
    housing means for enclosing said telephone light adapter;
    control means mounted within said housing means for receiving an input signal from a telephone line and further including a circuit for controlling the connection of an alternating current power source to a light fixture;
    direct current supply means in electrical communication with said circuit for supplying direct current voltage to said control means;
    logic means located within said circuit for recognizing an incoming telephone call and for signaling for the connection of the alternating current power source to said light fixture, said logic means comprising an off-hook detection circuit for providing a signal voltage to said connection means when said telephone line is in use; and
    connection means located within said circuit for receiving a signal from said logic means and for connecting said light fixture to said alternating current power source upon the receipt of a telephone call.

10. A telephone light adapter for announcing an incoming telephone call and for visual assistance comprising, in combination:
    housing means for enclosing said telephone light adapter;
    control means mounted within said housing means for receiving an input signal from a telephone line and further including a circuit for controlling the connection of an alternating current power source to a light fixture;
    direct current supply means in electrical communication with said circuit for supplying direct current voltage to said control means;
    logic means located within said circuit for recognizing an incoming telephone call and for signaling for the connection of the alternating current power source to said light fixture, said logic means comprising a timer circuit having a charging capacitor for providing sustained light fixture illumination during periodic silent pauses of a ringing signal; and
    connection means located within said circuit for receiving a signal from said logic means and for connecting said light fixture to said alternating current power source upon the receipt of a telephone call.

11. The telephone light adapter of claim 1 wherein said logic means comprises a timer circuit for providing sustained light fixture illumination during a time delay period immediately after use of the telephone line.

12. The telephone light adapter of claim 1 wherein said logic means comprises an opto-coupler means for electrically isolating said logic means from said connection means.

13. A telephone light adapter for announcing an incoming telephone call and for visual assistance comprising, in combination:
housing means for enclosing said telephone light adapter;
control means mounted within said housing means for receiving an input signal from a telephone line and further including a circuit for controlling the connection of an alternating current power source to a light fixture;
direct current supply means in electrical communication with said circuit for supplying direct current voltage to said control means;
logic means located within said circuit for recognizing an incoming telephone call, said logic means further including an off-hook detection means for providing a positive output voltage for signaling for the connection of the alternating current power source to said light fixture; and
connection means located within said circuit for receiving a signal from said logic means and for connecting said light fixture to said alternating current power source upon the receipt of a telephone call, said connection means comprising a thyristor AC switch circuit having a phototransistor in optical communication with said logic means, said thyristor AC switch circuit for providing amplification of a current flowing in said phototransistor wherein said amplifier current triggers an electronic component for providing a completed circuit for said light fixture.

14. A telephone light adapter for visibly announcing an incoming telephone call and for visual assistance comprising, in combination:
a housing for enclosing said telephone light adapter;
a control box mounted within side housing for receiving an input signal from a telephone line input conductor and further including an electronic circuit for controlling the connection of an alternating current voltage source to a light fixture in electrical communication with the control box;
direct current supply means in electrical communication with said electronic circuit for supplying direct current voltage to said control box;
switching means mounted on said housing for changing the mode of operation of said telephone light adapter;
logic means located within said electronic circuit for recognizing an incoming telephone call, said logic means further including a ring detection means of identifying when a ringing signal exists on said telephone line input conductor and for providing a positive rectified voltage which signals for the connection of the alternating current voltage source to said light fixture, said logic means further comprising means for the sustained illumination of said light fixture during periodic pauses of a ringing signal and during a time delay period immediately after use of the telephone line input conductor; and
connection means located within said electronic circuit for receiving a signal from said logic means for controlling the connection of said light fixture to said alternating current voltage source upon the receipt of a telephone call, said connection means comprising a thyristor AC switch circuit having a phototransistor in optical communication with said logic means, said thyristor AC switch circuit for providing amplification of a current flowing in said phototransistor wherein said amplified current triggers an electronic component for providing a completed circuit for said light fixture.

15. The telephone light adapter of claim 14 wherein said control box further includes a connection block for removably connecting said light fixture and said telephone to said control box, said light fixture being integrally mounted within said control box.

16. The telephone light adapter of claim 14 wherein said switching means comprises a three-position switch including an "automatic" position, an "on" position, and an "off" position, said automatic position for connecting said light fixture to said alternating current voltage source upon the receipt of an incoming telephone call, said "on" position for continuously connecting said light fixture to said alternating current voltage source, and said "off" position for continuous disconnection of said light fixture from said alternating current voltage source.

17. A telephone light adapter for visibly announcing an incoming telephone call and for visual assistance comprising, in combination:
a housing for enclosing said telephone light adapter;
a control box mounted within said housing for receiving an input signal from a telephone line input conductor and further including an electronic circuit for controlling the connection of an alternating current voltage source to a light fixture in electrical communication with the control box;
direct current supply means in electrical communication with said electronic circuit for supplying direct current voltage to said control box;
switching means mounted on said housing for changing the mode of operation of said telephone light adapter;
logic means located within said electronic circuit for recognizing an incoming telephone call, said logic means further including a ring detection means for identifying when a ringing signal exists on said telephone line input conductor and for providing a positive rectified voltage which signals for the connection of the alternating current voltage source to said light fixture, said logic means further comprising means for the sustained illumination of said light fixture during periodic pauses of a ringing signal and during a time delay period immediately after use of the telephone line input conductor and further comprising an off-hook detection means for providing a signal voltage to said connection means when said telephone line input conductor is in use; and
connection means located within said electronic circuit for receiving a signal from said logic means for controlling the connection of said light fixture to said alternating current voltage source upon the receipt of a telephone call.

18. The telephone light adapter of claim 14 wherein said means for providing sustained light fixture illumination during periodic silent pauses of a ringing signal and during a time delay period immediately after use of the telephone line comprises a timer circuit.

19. The telephone light adapter of claim 14 wherein said logic means comprises an opto-coupler means for electrically isolating said logic means from said connection means, said thyristor AC switch circuit within said connection means further including a triggering circuit comprised of a cross-coupled pair of transistors for providing a sensitive conduction device and for precisely firing a gating circuit of said conduction device causing conduction for one-half cycle.

20. A telephone light adapter for visibly announcing the in-use condition of a telephone set and for providing visual assistance comprising, in combination:

a housing for enclosing said telephone light adapter;
a control box mounted within said housing for receiving an input signal from a telephone line input conductor and further including an electronic circuit for controlling the connection of an alternating current voltage source to a light fixture in electrical communication with the control box;
direct current supply means in electrical communication with said electronic circuit for supplying direct current voltage to said control box;
switching means mounted on said housing for changing the mode of operation of said telephone light adapter;
logic means located within said electronic circuit for recognizing when said telephone line input conductor is in use, said logic means further including an off-hook detection means for providing a positive output voltage for controling the connection of said light fixture to said alternating current voltage source when said telephone line input conductor is in use, said logic means further including a timer circuit for providing sustained illumination of said light fixture during periodic pauses of a ringing signal and during a time delay period immediately after use of the telephone line input conductor; and
connection means located within said electronic circuit for receiving a signal from said logic means for controlling the connection of said light fixture to said alternating current voltage source when said telephone line input conductor is in use, said connection means further including a thyristor AC switch circuit having a phototransistor electrically isolated from and in optical communication with said logic means, said thyristor AC switch circuit for providing amplification of a current flowing in said phototransistor wherein said amplified current triggers an electronic component for providing a completed circuit for said light fixture.

21. The telephone light adapter of claim 1 wherein said switching means comprises a thyristor AC switch circuit.

22. The telephone light adapter of claim 21 wherein said thyristor AC switch circuit further includes a triggering circuit comprised of a cross-coupled pair of transistors for providing a sensitive conduction device and for precisely firing a gating circuit of said conduction device causing conduction for one-half of a cycle.

23. The telephone light adapter of claim 1 wherein said optical transducer comprises a phototransistor.

24. The telephone light adapter of claim 1 wherein said amplified parameter is an electrical current.

* * * * *